(12) United States Patent
Kuwajima et al.

(10) Patent No.: US 10,531,263 B2
(45) Date of Patent: Jan. 7, 2020

(54) TERMINAL DEVICE AND COMMUNICATION SYSTEM

(71) Applicant: SHARP KABUSHIKI KAISHA, Sakai, Osaka (JP)

(72) Inventors: Hidenori Kuwajima, Sakai (JP); Hiroki Tanabe, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/215,219

(22) Filed: Dec. 10, 2018

(65) Prior Publication Data

US 2019/0182648 A1 Jun. 13, 2019

(30) Foreign Application Priority Data

Dec. 11, 2017 (JP) ................................ 2017-236896

(51) Int. Cl.
*H04B 5/00* (2006.01)
*H04W 4/80* (2018.01)
*H04W 12/00* (2009.01)
*H04W 88/06* (2009.01)
*H04W 12/06* (2009.01)
*H04W 92/18* (2009.01)

(52) U.S. Cl.
CPC ....... *H04W 4/80* (2018.02); *H04W 12/00403* (2019.01); *H04W 12/06* (2013.01); *H04W 88/06* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 9,520,918 | B2 * | 12/2016 | Adrangi | H04B 5/00 |
| 9,699,594 | B2 * | 7/2017 | Sarkar | H04W 4/80 |
| 9,762,650 | B2 * | 9/2017 | Karlson | H04L 67/06 |
| 9,998,911 | B2 * | 6/2018 | Chu | H04W 8/183 |
| 10,212,136 | B1 * | 2/2019 | Gehret | H04L 63/0428 |
| 10,231,128 | B1 * | 3/2019 | Ziraknejad | H04W 12/08 |
| 2011/0047609 | A1 * | 2/2011 | Tetsuhashi | G06F 21/35 726/7 |
| 2012/0054745 | A1 | 3/2012 | Yamashita | |
| 2018/0091930 | A1 * | 3/2018 | Jefferies | H04L 67/125 |

FOREIGN PATENT DOCUMENTS

JP 2012-048483 A 3/2012
JP 2017-113032 A 6/2017

* cited by examiner

*Primary Examiner* — Tuan A Tran
(74) *Attorney, Agent, or Firm* — ScienBiziP, P.C.

(57) ABSTRACT

A communication system including: a first terminal device capable of carrying out communication via a first communication network; and a second terminal device capable of carrying out communication via a second communication network, achieves higher usability after completion of use of the second terminal device. The second terminal device includes a second control section configured to: communicate with a predetermined server via the second communication network by use of user information, obtained from the first terminal device, about a user of the first terminal device; and save, on the predetermined server, data that is generated through the communication carried out by use of the user information at completion of that communication.

2 Claims, 9 Drawing Sheets

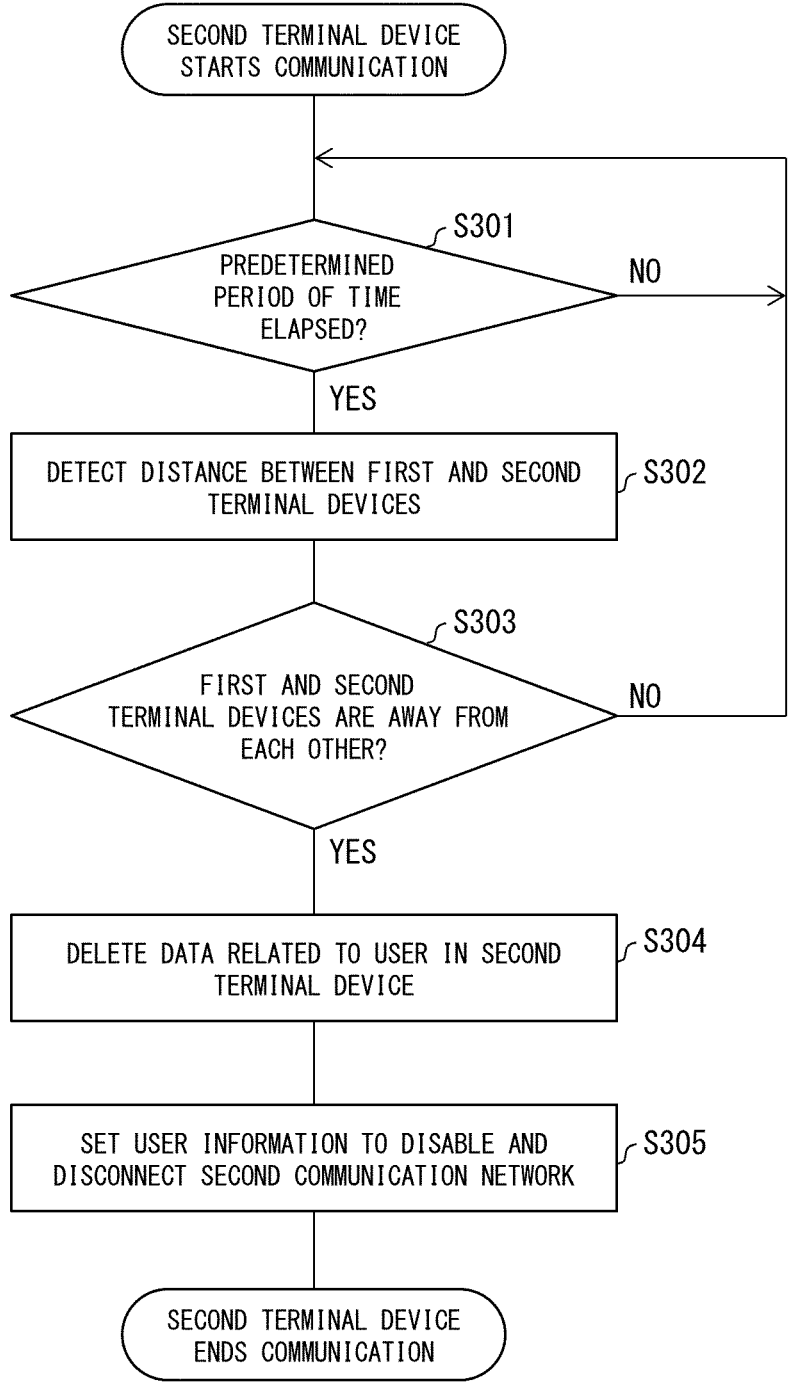

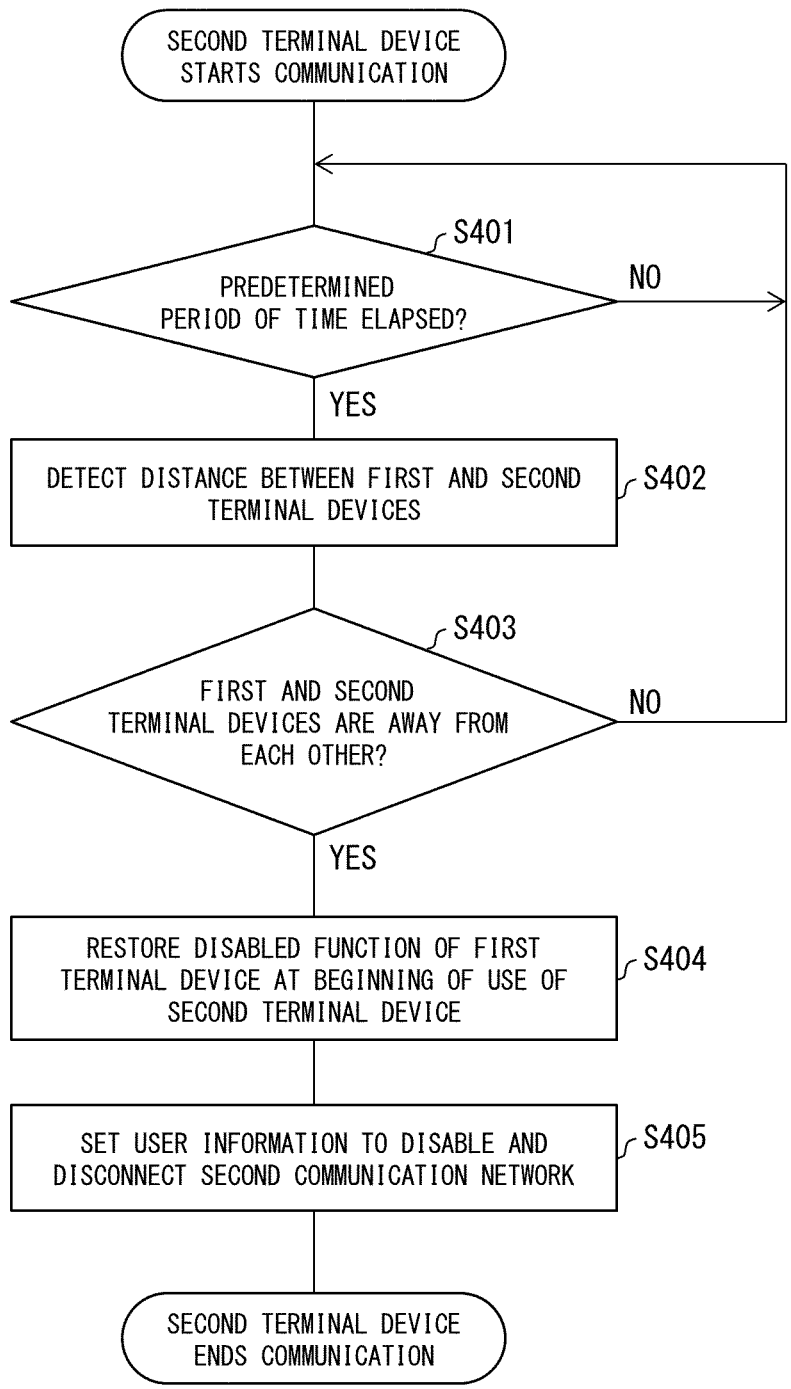

TERMINAL DEVICE AND COMMUNICATION SYSTEM

This Nonprovisional application claims priority under 35 U.S.C. § 119 on Patent Application No. 2017-236896 filed in Japan on Dec. 11, 2017, the entire contents of which are hereby incorporated by reference.

TECHNICAL FIELD

The present invention relates to a terminal device and a communication system including the terminal device.

BACKGROUND ART

In recent years, 5G communication standards have been under development as the next-generation communication standards substituting for the 3G and 4G communication standards. One requirement of the 5G communication standards is a high throughput of more than 10 Gbps. Applications utilizing such a high throughput are expected to come onto the market. However, some devices, especially portable terminal devices, have difficulty in incorporating hardware for realizing a high throughput inherent in a 5G communication network. In such a case, the high throughput of the 5G communication network may possibly not be utilized in the portable terminal devices.

CITATION LIST

Patent Literature

[Patent Literature 1]
Japanese Patent Application Tokugan No. 2017-113032

SUMMARY OF INVENTION

Technical Problem

In order to solve the above problem, the inventors of the present invention have devised a communication system including (i) a first terminal device configured to carry out communication via a first communication network, (ii) a second terminal device configured to carry out communication via a second communication network, and (iii) an authentication unit configured to determine whether or not user information in the first terminal device is available on the second terminal device and, based on a result of the determination, give the second terminal device a permission to carry out communication via the second communication network by use of at least part of the user information in the first terminal device (see Patent Literature 1). However, the above communication system can be further improved of its operation at the completion of use of the second terminal device.

It is an object of an aspect of the present invention to provide a communication system including: a first terminal device capable of carrying out communication via a first communication network; and a second terminal device capable of carrying out communication via a second communication network, the communication system achieving higher usability after completion of use of the second terminal device.

Solution to Problem

In order to attain the above object, a second terminal device in accordance with an aspect of the present invention is configured to be a second terminal device which is capable of carrying out communication with a first terminal device capable of communication via a first communication network and is also capable of carrying out communication via a second communication network, the second terminal device including a second control section, the second control section being configured to: communicate with a predetermined server via the second communication network by use of user information, obtained from the first terminal device, about a user of the first terminal device; and save, on the predetermined server, data that is generated through the communication carried out by use of the user information at completion of that communication.

A second terminal device in accordance with another aspect of the present invention is configured to be a second terminal device which is capable of carrying out communication with a first terminal device capable of carrying out communication via a first communication network and is also capable of carrying out communication via a second communication network, the second terminal device including: a second control section; and a second storage section, the second control section being configured to: carry out communication via the second communication network by use of user information, obtained from the first terminal device, about a user of the first terminal device; and delete data related to the user from the second storage section at completion of the communication carried out by use of the user information.

A first terminal device in accordance with an aspect of the present invention is configured to be a first terminal device which is capable of carrying out communication with a second terminal device capable of carrying out communication via a second communication network and is also capable of carrying out communication via a first communication network, the first terminal device including: a first control section, the first control section being configured to: transmit user information about a user of the first terminal device to the second terminal device and cause the second terminal device to carry out communication via the second communication network by use of the user information and also limit at least partially a communication function performed via the first communication network; and cancel the limitation at completion of the communication carried out via the second communication network.

Advantageous Effects of Invention

According to an aspect of the present invention, a communication system including: a first terminal device capable of communication via a first communication network; and a second terminal device capable of communication via a second communication network, achieves higher usability after completion of use of the second terminal device.

BRIEF DESCRIPTION OF DRAWINGS

FIG. 9 is a flowchart illustrating a process flow of functions of a communication system in accordance with Embodiment 2 of the present invention.

FIG. 10 is a flowchart illustrating a process flow of functions of a communication system in accordance with Embodiment 3 of the present invention.

DESCRIPTION OF EMBODIMENTS (Overview of Communication System in Accordance with an Aspect of the Present Invention)

Prior to the description of embodiments of the present invention, the following description will discuss an overview of a communication system in accordance with an aspect of the present invention. First, a configuration of the entire communication system and a configuration of individual devices will be discussed with reference to FIGS. 1 to 5. Next, referring to FIGS. 6 and 7, a general explanation is made on a process performed during and at the completion of use of the second terminal device.

(Configuration of Entire Communication System and Configuration of Individual Devices)

(Entire Communication System)

Figure 1:
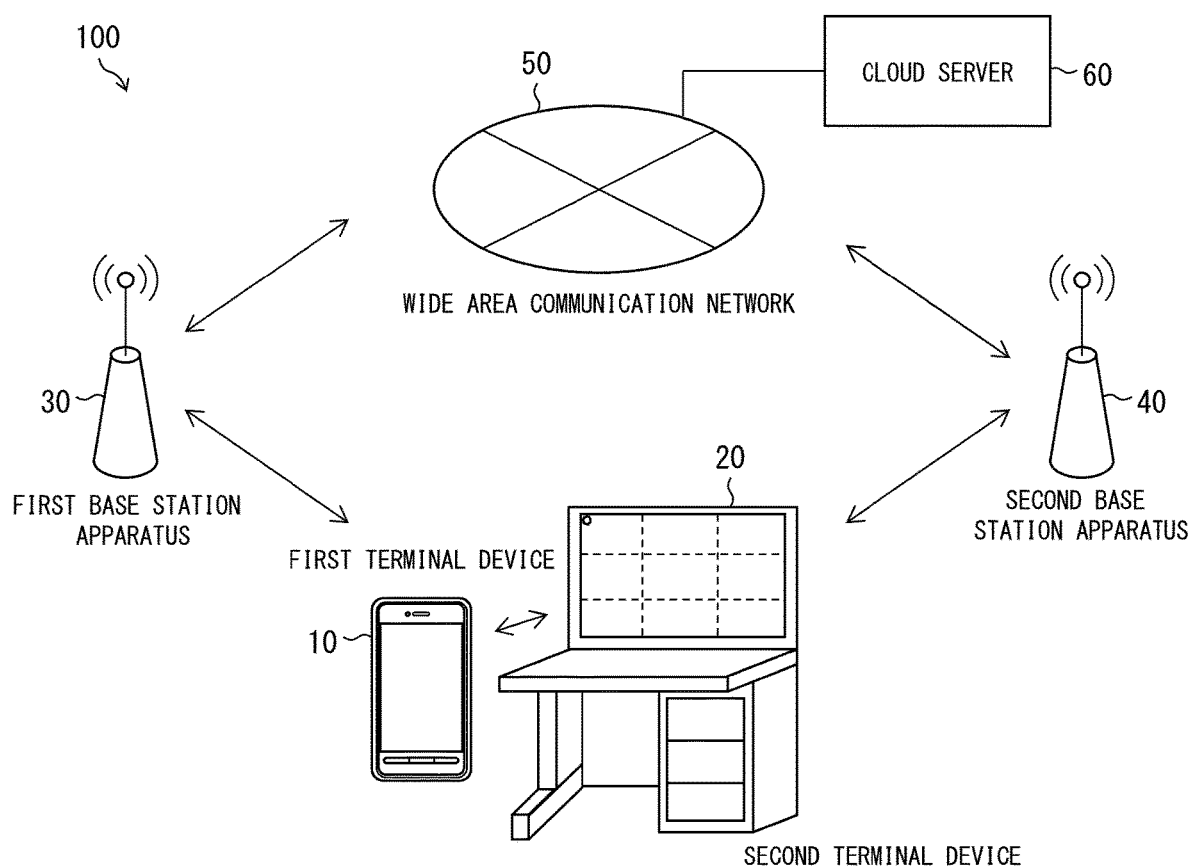
FIG. 1 is a view schematically illustrating a communication system in accordance with an aspect of the present invention.

As illustrated in FIG. 1, a communication system 100 includes a first terminal device 10 (e.g., a smartphone) and a second terminal device 20 (e.g., a desktop common terminal having a 5G communication function). Note that one second terminal device 20 can be shared between or among a plurality of first terminal devices 10. In other words, the communication system 100 may include the plurality of first terminal devices 10.

The first terminal device 10 can communicate with a first base station apparatus 30 (e.g., an access point or LTE eNodeB) on a first communication network (e.g., a 4G line). On the other hand, the second terminal device 20 can communicate with a second base station apparatus 40 (e.g., an access point or 5G gNodeB) on a second communication network (e.g., a 5G line). Moreover, communication between the first terminal device 10 and the second terminal device 20 can be short range communication. To give a specific example, the first terminal device 10 and the second terminal device 20 can communicate with each other via, for example, Wi-Fi (registered trademark) or Bluetooth (registered trademark).

The first base station apparatus 30 and the second base station apparatus 40 are both connected, in an intercommunicable manner, to a wide area communication network 50 (e.g., the Internet). The wide area communication network 50 is connected to, for example, a cloud server 60 (predetermined server). Note that the first base station apparatus 30 and the second base station apparatus 40 can be integrated into a single apparatus.

(First Terminal Device and Second Terminal Device)

Figure 2:
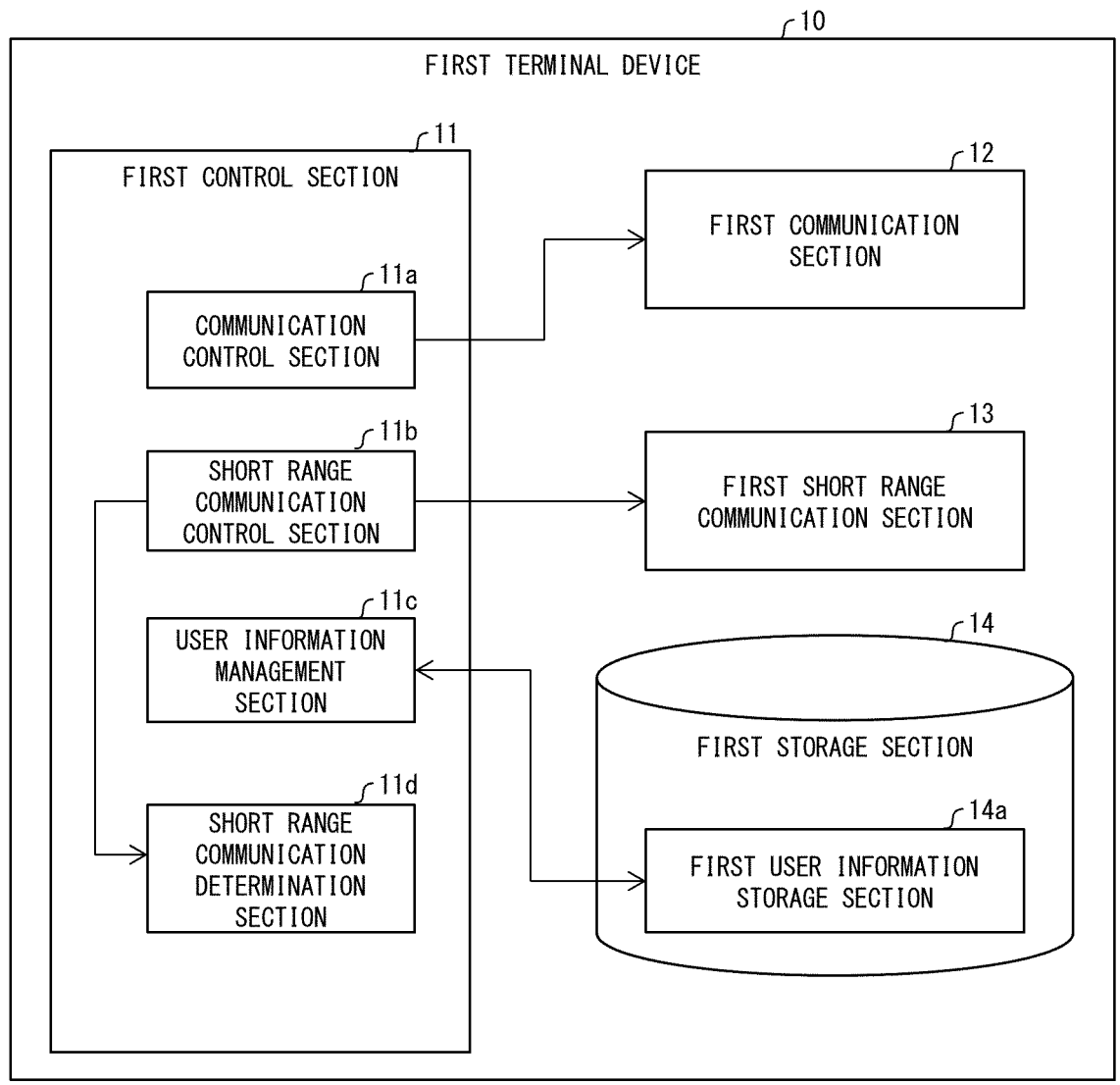
FIG. 2 is a block diagram illustrating a main part of a first terminal device of the communication system in FIG. 1.

As illustrated in FIG. 2, the first terminal device 10 includes a first control section 11, a first communication section 12, a first short range communication section 13, and a first storage section 14.

The first control section 11 (e.g., CPU) centrally controls individual sections of the first terminal device 10. The first control section 11 includes a communication control section 11a, a short range communication control section 11b, a user information management section 11c, and a short range communication determination section 11d. The communication control section 11a controls communication carried out via the first communication section 12. The short range communication control section 11b controls communication carried out via the first short range communication section 13. The user information management section 11c manages user information stored in a first user information storage section 14a. More specifically, the user information management section 11c carries out reading and writing of user information, switching of the attribute (enable or disable) of the user information, and other operations. The short range communication determination section 11d refers to information from the short range communication control section 11b to determine whether or not the first terminal device 10 and the second terminal device 20 are in short range communication with each other.

The first communication section 12 (e.g., 4G communication modem) carries out communication via the first communication network. The first short range communication section 13 carries out short range communication with the second terminal device 20 (e.g., via Wi-Fi (registered trademark) or Bluetooth (registered trademark)). The first storage section 14 stores various types of data to be used by the first terminal device 10. The first storage section 14 includes a non-volatile storage device (e.g., flash memory and read only memory (ROM)), and a volatile storage device (e.g., random access memory (RAM)).

The first storage section 14 includes the first user information storage section 14a that stores user information (SIM information, a user ID, etc.). At least part of the user information is transmitted to the second terminal device 20. Then, the second terminal device 20 carries out communication via the second communication network by use of the received user information. This allows a user of the first terminal device 10 to carry out communication via the second communication network that cannot be accessed from the first terminal device 10, by use of the user information stored in the first terminal device 10.

Figure 3:
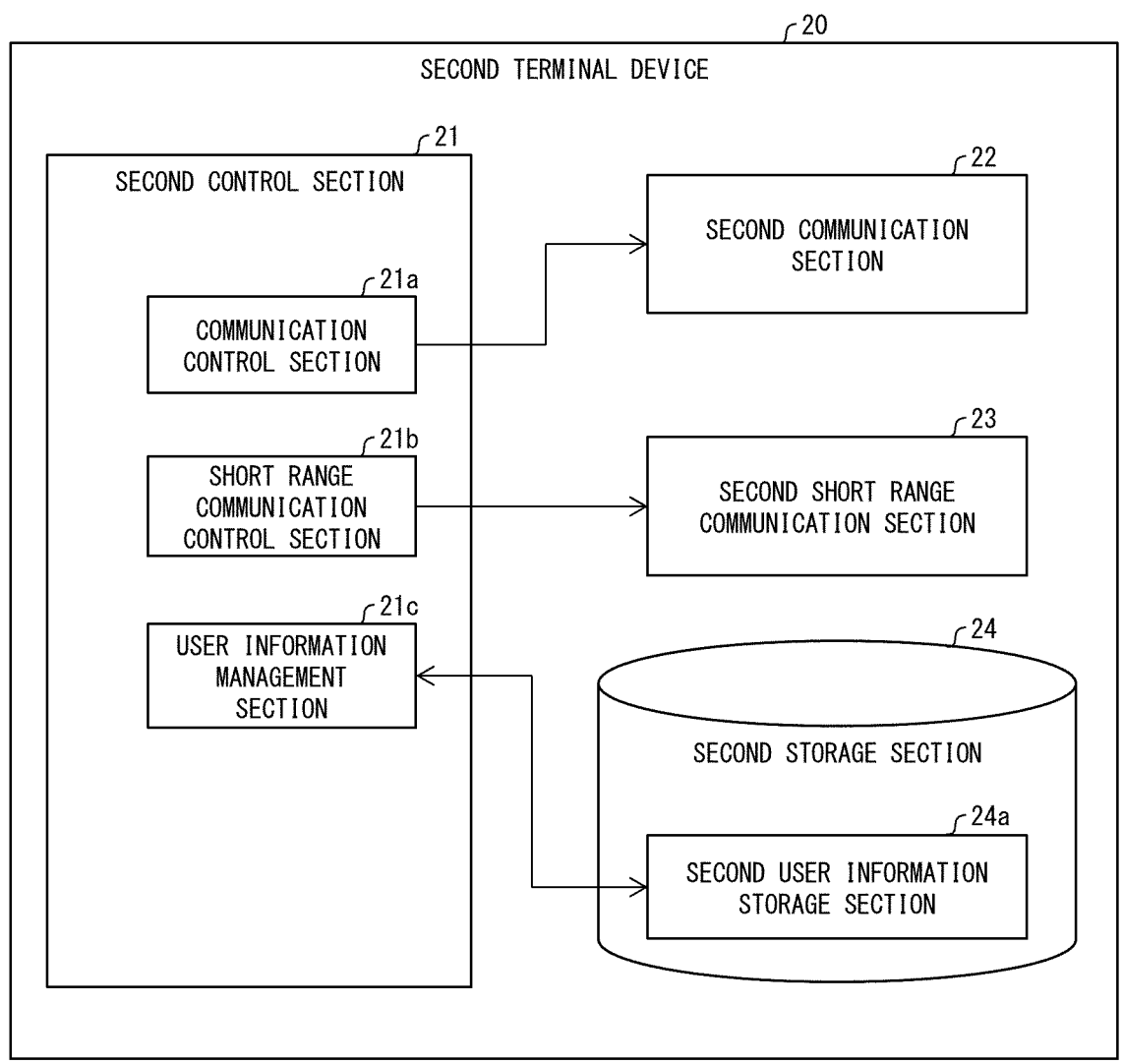
FIG. 3 is a block diagram illustrating a main part of a second terminal device of the communication system in FIG. 1.

As illustrated in FIG. 3, the second terminal device 20 includes a second control section 21, a second communication section 22, a second short range communication section 23, and a second storage section 24.

The second control section 21 (e.g., CPU) centrally controls individual sections of the second terminal device 20. The second control section 21 includes a communication control section 21a, a short range communication control section 21b, and a user information management section 21c. The communication control section 21a controls communication carried out via the second communication section 22. The short range communication control section 21b controls communication carried out via the second short range communication section 23. The user information management section 21c manages user information received from the first terminal device 10.

The second communication section 22 (e.g., 5G communication modem) communicates via the second communication network. The second communication network can be any network different from the first communication network. The second communication network may be a network accessible from the first terminal device itself or a network inaccessible from the first terminal device 10 itself. For example, the second communication network may be a communication network that allows for higher-speed, higher-capacity communication than the first communication network.

The second short range communication section 23 carries out short range communication with the first terminal device 10 (e.g., via Wi-Fi (registered trademark) or Bluetooth (registered trademark)). The second storage section 24 stores various types of data to be used by the second terminal device 20. Similar to the first storage section 14, the second storage section 24 includes a non-volatile storage device and a volatile storage device. The second storage section 24 includes a second user information storage section 24a. The second user information storage section 24a stores user information received from the first terminal device 10.

(Variation Concerning Short Range Communication Determination Section)

The embodiments described herein assume that the short range communication determination section is included in the first control section 11. However, the short range communication determination section can be included in the second control section 21. Alternatively, both the first control section 11 and the second control section 21 can include the short range communication determination section. Even in such cases, the same process can be performed in accordance with process flows discussed in Embodiments 1 to 4 below.

(First Base Station Apparatus and Second Base Station Apparatus)

Figure 4:
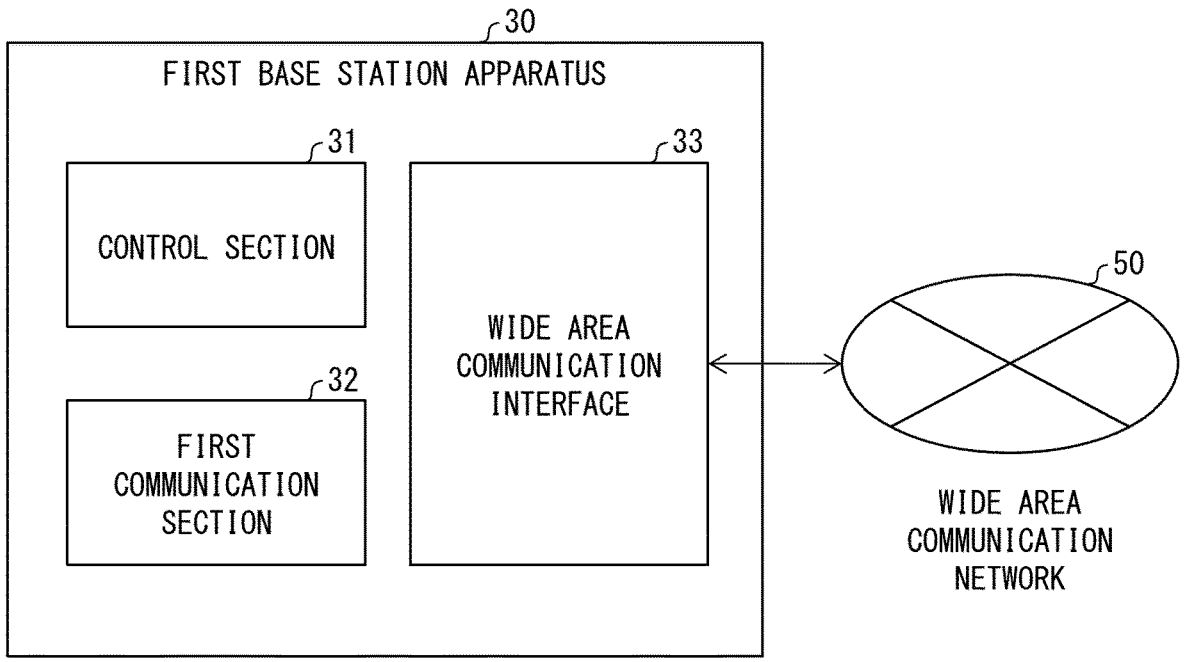
FIG. 4 is a block diagram illustrating a main part of a first base station apparatus of the communication system in FIG. 1.

As illustrated in FIG. 4, the first base station apparatus includes a control section 31 (e.g., a CPU), a first communication section 32 (e.g., a 4G communication modem), and a wide area communication interface 33 (e.g., a gateway).

The control section 31 controls various functions of the first base station apparatus 30. For example, the control section 31 controls the first communication section 32 and the wide area communication interface 33.

The first communication section 32 can carry out communication via the first communication network (e.g., a 4G line). Hence, the first base station apparatus 30 can carry out communication with the first terminal device 10 via the first communication network. The wide area communication interface 33 mediates communication between the first base station apparatus 30 and the wide area communication network 50.

Figure 5:
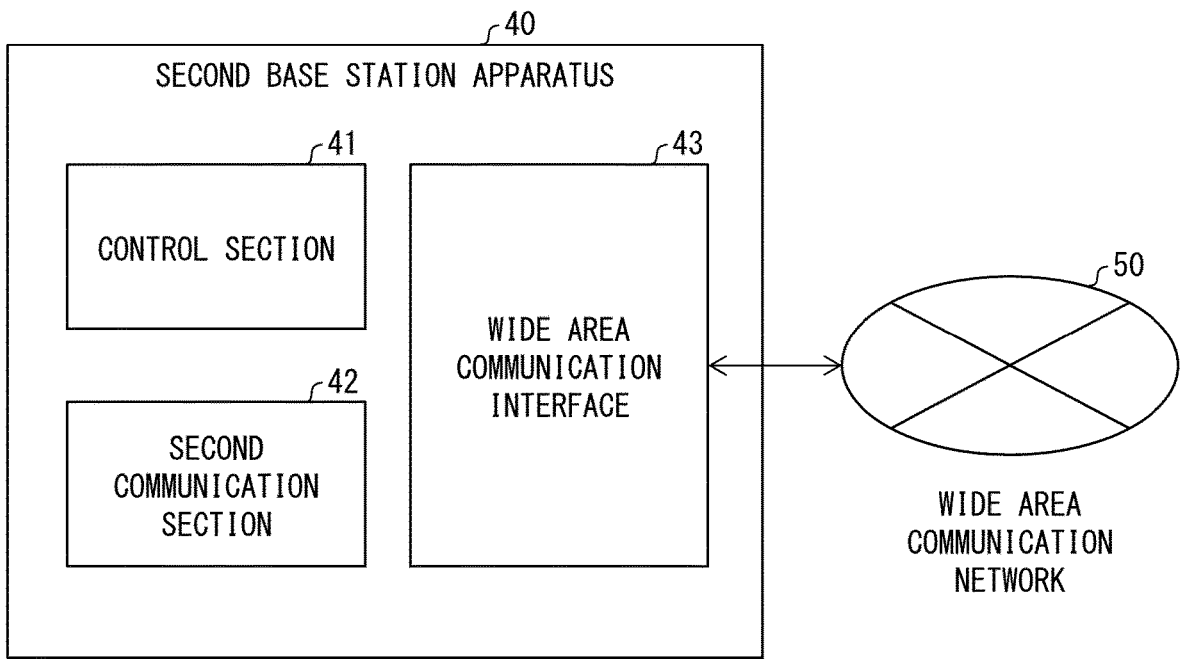
FIG. 5 is a block diagram illustrating a main part of a second base station apparatus of the communication system in FIG. 1.

As illustrated in FIG. 5, the second base station apparatus 40 includes a control section 41 (e.g., a CPU), a second communication section 42 (e.g., a 5G communication modem), and a wide area communication interface 43 (e.g., a gateway).

The second communication section 42 can carry out communication via the second communication network (e.g., a 5G line). Hence, the second base station apparatus 40 can carry out communication with the second terminal device 20 via the second communication network. Note that the other members of the second base station apparatus 40 are not described here since the functions of these members can be understood from the explanation about the corresponding members of the first base station apparatus 30.

(Process Executed at Beginning of or During Use of Second Terminal Device)

Before use of the second terminal device 20, it is necessary to transmit to the second terminal device 20 user information stored in the first user information storage section 14a. At this time, the user information can be transmitted to the second terminal device 20 by any method with no particular limitation. For example, the user information can be transmitted from the first terminal device 10 to the second terminal device 20 via the first base station apparatus 30 and the second base station apparatus 40. To give another example, the user information can be directly transmitted from the first terminal device 10 to the second terminal device 20 via the short range communication.

The user information management section 21c of the second terminal device 20 stores the user information received from the first terminal device 10 in the second user information storage section 24a. Then, the user information management section 21c carries out reading and writing of the user information, switching of the attribute (enable or disable) of the user information, and other operations. Further, the communication control section 21a can carry out communication via the second communication network by use of the user information stored in the second user information storage section 24a. This enables communication with, for example, the cloud server 60 on the wide area communication network 50 via the second communication network.

When the second terminal device 20 is in use, the user information stored in the first user information storage section 14a is in the following three patterns of state (see FIG. 6).

Figure 6:
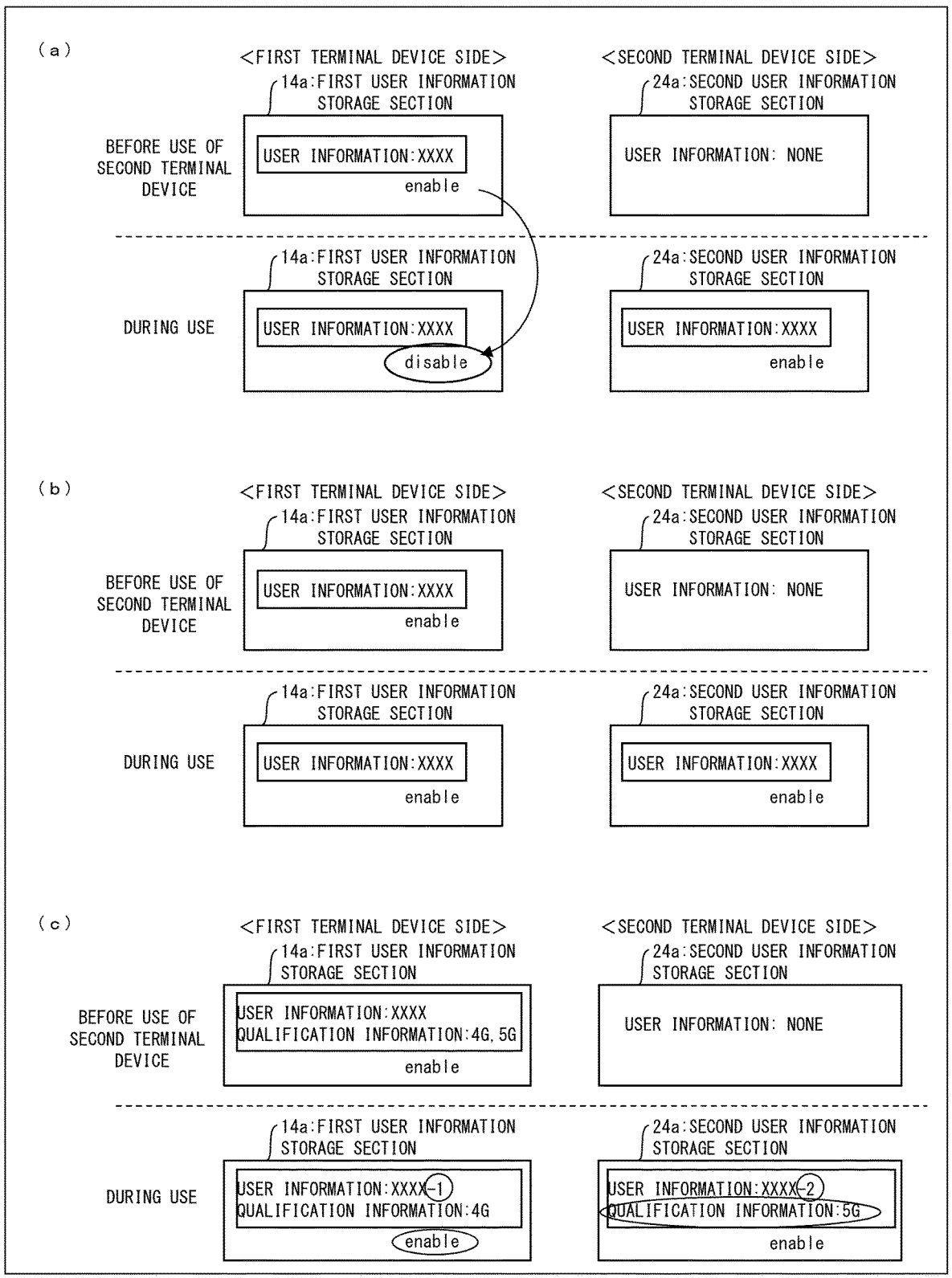
FIG. 6 is a view for explaining three patterns of state of user information stored in the first terminal device during use of the second terminal device, in which (a) of FIG. 6 illustrates "switch" of user information, (b) of FIG. 6 illustrates "replication" of the user information, and (c) of FIG. 6 illustrates "division" of the user information.

The first pattern is "switch" (see (a) of FIG. 6). According to this pattern, the attribute of the user information stored in the first user information storage section 14a is "enable" before use of the second terminal device 20, but is switched to "disable" during use of the second terminal device 20. Hence, in such a period that the first terminal device 10 provides user information to the second terminal device 20 (i.e., during use of the second terminal device 20), the first terminal device 10 cannot use the user information. This makes it impossible, for example, to carry out communication via the first communication network (e.g., a 4G line) by use of the user information.

The second pattern is "replication" (see (b) of FIG. 6). According to this pattern, the attribute of the user information stored in the first user information storage section 14a is invariably "enable" before and during use of the second terminal device 20. Thus, even in such a period that the first terminal device 10 provides user information to the second terminal device 20 (i.e., during use of the second terminal device 20), the first terminal device 10 can use the user information with no limitations.

The third pattern is "division" (see (c) of FIG. 6). The attribute of the user information stored in the first user information storage section 14a is "enable" for both of "4G" and "5G" before use of the second terminal device 20 but is "enable" for "4G" alone during use of the second terminal device 20. As for "5G", the attribute "enable" is effective in the second user information storage section 24a of the second terminal device 20. In this case, the first terminal device 10 can carry out communication via the 4G line, and the second terminal device 20 can carry out communication via the 5G line.

(Determination as to Completion of Use of Second Terminal Device)

Figure 7:
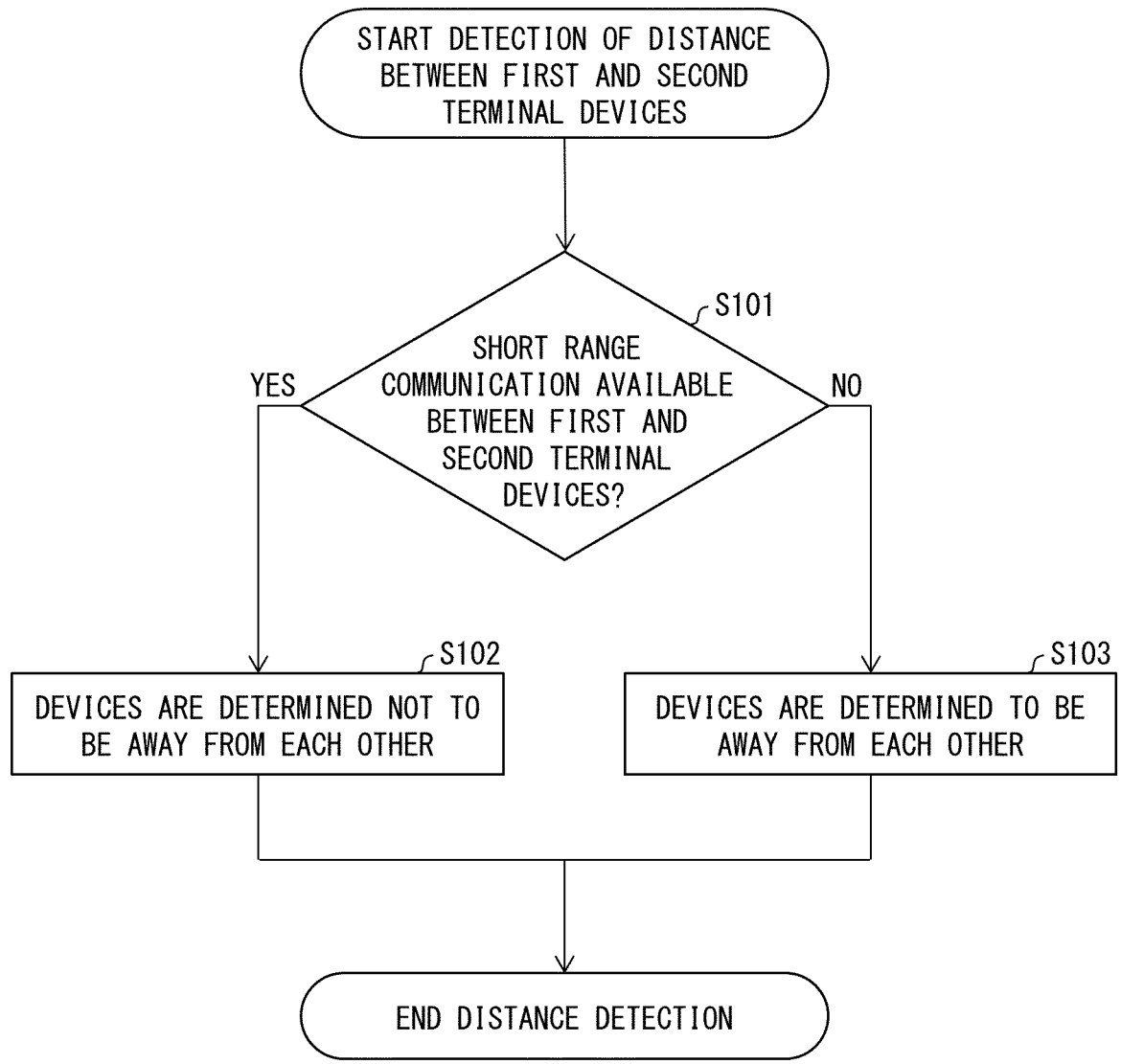
FIG. 7 is a flowchart illustrating a process flow for determining whether a distance is increased between first and second terminal devices in a communication system in accordance with an aspect of the present invention.

A main feature of the present disclosure resides in a process performed at the completion of communication carried out by the second terminal device 20 via the second communication network by use of user information about a user of the first terminal device 10. Whether or not the communication is completed (i.e., whether or not the use of the second terminal device 20 is completed) can be determined by any method with no particular limitation. For example, considering that the second terminal device 20 is a common terminal as discussed above, most users, after having finished using the second terminal device 20, supposedly leave there. It can be accordingly determined that the use of the second terminal device 20 has been completed based on the fact that the first terminal device 10 moves away from the second terminal device 20 (a distance increases between the two terminal devices). "Whether or not a distance is increased between the first terminal device 10 and the second terminal device 20" can be determined based on, for example, "whether or not short range communication is available between the first terminal device 10 and the second terminal device 20 (whether or not one terminal can detect the other terminal through short range communication)". Referring to FIG. 7, a flow of the process performed at this time is described below.

S101: The short range communication determination section 11d determines whether or not short range communication is available between the first terminal device and the second terminal device 20 with reference to information from the short range communication control section 11b. This determination can be made by determining, for example, "whether or not the first short range communication section 13 can receive a Wi-Fi (registered trademark) signal (SSID) transmitted from the second terminal device 20". To give another example, the above determination can be made by determining "whether or not the first short range communication section 13 can receive Bluetooth (registered trademark) radio waves transmitted from the second terminal device 20". In a case where a result of the determination in S101 is YES, the process proceeds to S102. In a case where the result of the determination in S101 is NO, the process proceeds to S103.

S102: In a case where the short range communication is determined to be available in S101, the short range communication determination section 11d determines that a distance is not increased between the two terminal devices, i.e., determines that the second terminal device 20 is being still used.

S103: In a case where the short range communication is determined to be unavailable in S101, the short range communication determination section 11d determines that a distance is increased between the two terminal devices, i.e., determines that the use of the second terminal device 20 is completed.

Here, FIG. 7 illustrates that the short range communication determination section 11d is included in the first control section 11 (first terminal device 10). However, in a case where the short range communication determination section 11d is included in the second control section (second terminal device 20) as well, whether or not a distance is increased between the first terminal device 10 and the second terminal device 20 can be determined in accordance with the above process flow.

(Variation Concerning Completion of Use of Second Terminal Device)

The determination as to whether the use of the second terminal device 20 is completed can be achieved by any other method as well. For example, the completion of use of the second terminal device 20 can be determined based on a predetermined termination operation (e.g., a press of an end button) performed on the second terminal device 20 (or the first terminal device 10).

Embodiment 1

Figure 8:
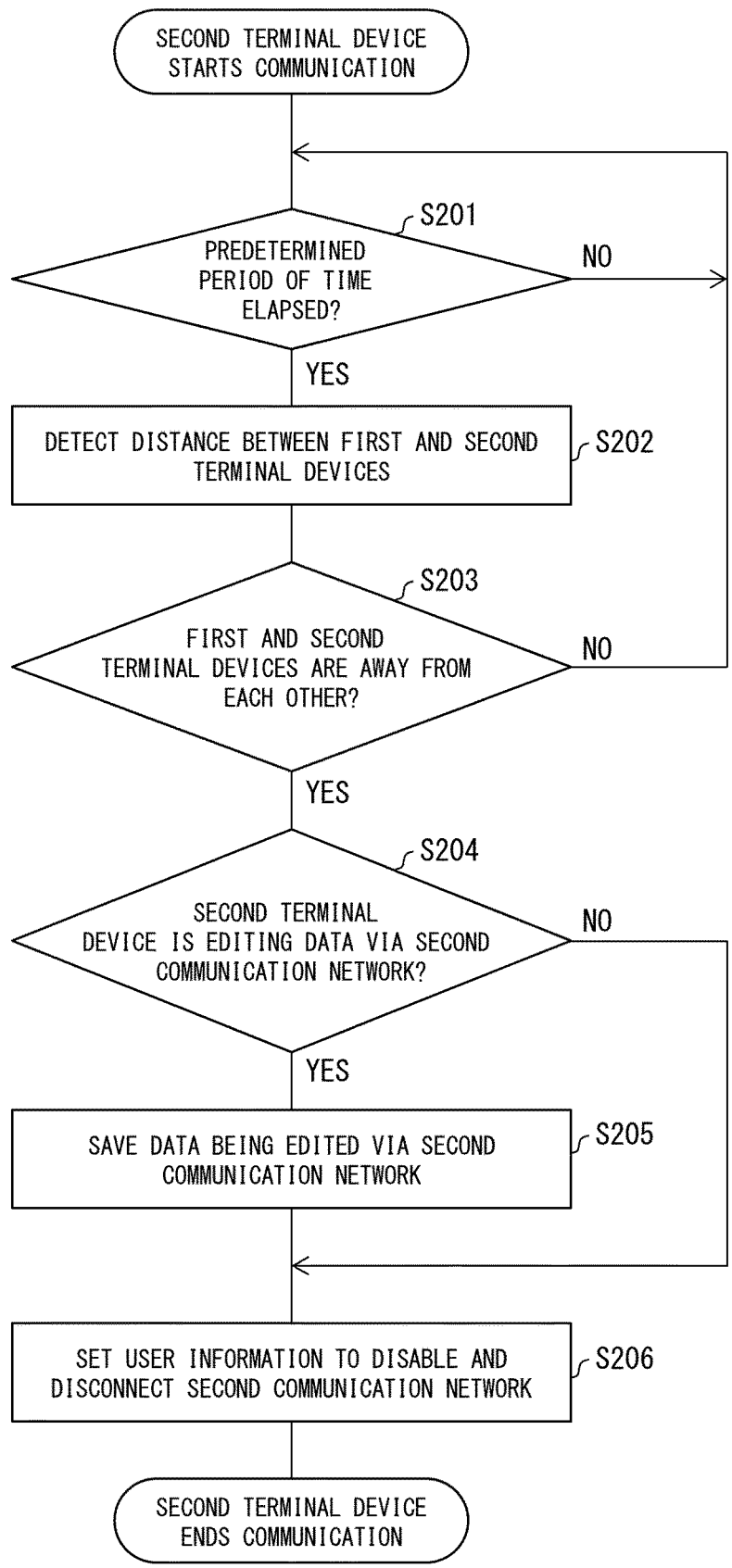
FIG. 8 is a flowchart illustrating a process flow of functions of a communication system in accordance with Embodiment 1 of the present invention.

The description of Embodiment 1 discusses a function of saving, at the completion of communication carried out by the second terminal device 20 by use of user information about a user of the first terminal device 10 (i.e., at the completion of use of the second terminal device 20), data generated through the communication on a predetermined server (e.g., cloud server 60). According to this function, data generated during use of the second terminal device 20 is saved on the predetermined server at the completion of use of the second terminal device 20. There is accordingly no fear that unsaved data is lost at the completion of use of the second terminal device 20. Further, after the completion of use of the second terminal device 20, the latest data can be available for use by the first terminal device 10. Referring to FIG. 8, this function is discussed below.

S201: The short range communication determination section 11d determines whether or not a predetermined period of time has elapsed. Upon the first execution of S201, the short range communication determination section 11d determines whether or not a predetermined period of time has elapsed from the beginning of use of the second terminal device 20 (e.g., the time when the first terminal device 10 transmits user information to the second terminal device 20). Upon the second and subsequent executions of S201, the short range communication determination section 11d determines whether or not a predetermined period of time has elapsed from the previous determination in S201. In a case where a result of the determination in S201 is YES, the process proceeds to S202. In a case where the result of the determination in S201 is NO, the operation in S201 is repeated.

S202, S203: The short range communication determination section 11d determines whether or not a distance is increased between the first terminal device 10 and the second terminal device 20. For details of S202, S203, refer to the explanation with reference to FIG. 7. In a case where a result of the determination in S203 is YES, the process proceeds to S204. In a case where the result of the determination in S203 is NO, the process proceeds to S201. Through the process including S201 to S203, whether or not a distance is increased between the first terminal device 10 and the second terminal device 20 is determined at regular time intervals.

S204: The short range communication determination section 11d transmits a signal indicative of the "completion of use of the second terminal device" to the second terminal device 20 via the first communication section 12. After the second control section 21 has received the above signal via the second communication section 22, the communication control section 21a determines whether or not data on the cloud server 60 is being edited. In a case where a result of the determination in S204 is YES, the process proceeds to S205. In a case where the result of the determination in S204 is NO, the process proceeds to S206.

S205: The communication control section 21a transmits the data being edited (i.e., data that is generated through communication between the second terminal device 20 and the cloud server 60) from the second communication section 22 via the second communication network, and saves the data on the cloud server 60. Note that the data to be saved can be any data generated through communication between the second terminal device 20 and the cloud server 60 and thus is not limited to data being edited.

S206: The user information management section 21c changes the attribute of the user information stored in the second user information storage section 24a to disable. Alternatively, the user information management section 21c can delete the user information stored in the second user information storage section 24a. After that, the communication control section 21a disconnects communication carried out by the second communication section 22 via the second communication network.

Note that Embodiment 1 can adopt the following configuration concerning the data generated through communication between the second terminal device 20 and the cloud server 60 as discussed above. That is, in a case where that data is still left in the second storage section 24 even after the data has been saved on the cloud server 60, the data is deleted from the second storage section 24. It follows that Embodiment 1 can be combined with Embodiment 2 below.

Embodiment 2

The description of Embodiment 2 discusses a function of deleting, at the completion of communication carried out by the second terminal device 20 by use of user information about a user of the first terminal device 10 (i.e., at the completion of use of the second terminal device 20), data related to the user from the second storage section 24. This function makes it possible to prevent leakage of personal information, etc. included in the data related to a user which is left in the second storage section 24, after the completion of use of the second terminal device 20. Moreover, this function can be used to delete data such as paid contents that a user has purchased from the second storage section, so that an unauthorized user cannot access the contents. Referring to FIG. 9, this function is discussed below.

S301 to S303: These steps are the same as those in FIGS. 7 and 8 (Embodiment 1) and thus, are omitted here.

S304: The user information management section 21c deletes data related to a user of the first terminal device 10 out of data stored in the second storage section 24. The data can be any data that is obtained by use of user information about the user of the first terminal device 10 or any data that the user enters while using the second terminal device 20 with the use of the user information. Conceivable examples of such data include user's personal information and contents downloaded by a user.

S305: This step is the same as that in FIGS. 7 and 8 (Embodiment 1) and thus, is omitted here.

Embodiment 3

The description of Embodiment 3 discusses a function of restoring, at the completion of the communication carried out by use of the user information (i.e., at the completion of use of the second terminal device), a communication function of the first terminal device 10 carrying out communication via the first communication network, at least a part of which is limited during the communication carried out by use of user information (i.e., during use of the second terminal device 20). According to this function, at the completion of use of the second terminal device 20, limitations on the communication carried out by the first terminal device 10 are cancelled (the communication on which the limitations are imposed can be either communication via the first communication network or communication via the second communication network). More specifically, for example, considering that the second terminal device 20 is used with the use of user information of the "switch" or "division" pattern which information is stored in the first user information storage section 14a, the attribute of the user information is changed from "disable" to "enable" in response to the completion of use of the second terminal device 20. Referring to FIG. 10, this function is described below.

S401 to S403: These steps are the same as those in FIGS. 7 and 8 (Embodiment 1) and thus, are omitted here.

S404: The user information management section 11c receives from the short range communication determination section 11d a determination result indicating that a distance is increased between the first terminal device 10 and the second terminal device 20 (i.e., the use of the second terminal device 20 is completed)". The user information management section 11c changes, in accordance with the determination result, the attribute of the user information stored in the first user information storage section 14a from "disable" to "enable" (in a case where the user information is in the "switch" pattern). Alternatively, the user information management section 11c changes the attribute of the user information stored in the first user information storage section 14a from "partially disable" to "enable" (in a case where the user information is in the "division" pattern).

S405: This step is the same as that in FIG. 8 (Embodiment 1) and thus, is omitted here.

Embodiment 4

In Embodiment 1 above, the process including S204 to S206 of FIG. 8 can be triggered by control from the first terminal device 10. For example, in a case where a distance is increased between the first terminal device 10 and the second terminal device 20 (Yes in S203), the first terminal device 10 can instruct the second terminal device 20 to carry out the process in S204. After receiving a determination result in S204 from the second terminal device 20, the first terminal device 10 can determine whether to cause the second terminal device 20 to perform the process in S205 and then the process in S206 or to cause the second terminal device 20 to skip the process in S205 and perform the process in S206, based on the determination result.

The same applies to Embodiment 2 above. That is, the process including S304 and S305 of FIG. 9 can be triggered by control from the first terminal device 10. For example, in a case where a distance is increased between the first terminal device 10 and the second terminal device 20 (Yes in S303), the first terminal device 10 can instruct the second terminal device 20 to perform the process including S304 and S305.

Moreover, in Embodiment 3 above, the process including S404 and S405 of FIG. 10 can be triggered by control from the second terminal device 20. For example, in a case where a distance is increased between the first terminal device 10 and the second terminal device 20 (Yes in S403), the second terminal device 20 can instruct the first terminal device 10 to perform the process including S404 and S405.

As such, the process to be performed by the first control section 11 in Embodiments 1 to 3 can be carried out based on information generated by the first control section 11 itself. Alternatively, upon receipt of information generated by the second control section 21 (including, for example, information indicative of the completion of use of the second terminal device 20 and an instruction to cause the first control section 11 to execute a predetermined process) in a signal form, the first control section 11 can execute the process in accordance with such an instruction. The same applies to the process to be executed by the second control section 21.

(Software Implementation Example)

Control blocks (especially, the first control section 11 and the second control section 21) of the first terminal device 10 and the second terminal device 20 can be implemented by a logic circuit (hardware) provided in an integrated circuit (IC chip), etc. or by software.

In the latter case, the first terminal device 10 and the second terminal device 20 each include a computer that executes an instruction from a program as software that realizes the above functions. This computer includes, for example, at least one processor (control device) as well as at least one computer-readable storage medium that stores the above program. With this configuration, the processor of the above computer reads and executes the program stored in the storage medium so as to achieve an object of an aspect of the present invention. The above processor can be, for example, a CPU. The storage medium may be a "non-transitory tangible medium", e.g., a ROM as well as a tape, a disk, a card, a semiconductor memory, a programmable logic circuit, etc. In addition, the computer may further include a RAM into which the above program is loaded in an executable form, and the like. Also, the above program can be supplied to the computer via any transmission medium (such as a communication network and a broadcast wave) which is allowed to transmit the program. Note that an aspect of the present invention can also be realized in the form of a data signal in which the program is embodied via electronic transmission and which is embedded in a carrier wave.

(Recap)

A second terminal device 20 in accordance with a first aspect of the present invention is a second terminal device 20 which is capable of carrying out communication with a first terminal device 10 capable of carrying out communication via a first communication network and is also capable of carrying out communication via a second communication network, the second terminal device 20 including a second control section 21, the second control section 21 being configured to: communicate with a predetermined server (cloud server 60) via the second communication network by use of user information, obtained from the first terminal device 10, about a user of the first terminal device 10; and save, on the predetermined server (cloud server 60), data that is generated through the communication carried out by use of the user information at completion of that communication.

According to the above configuration, data generated during use of the second terminal device 20 is saved on the predetermined server (cloud server 60) after completion of use of the second terminal device 20. There is accordingly no fear that unsaved data is lost at the completion of use of the second terminal device 20. Further, after completion of use of the second terminal device 20, the latest data can be available for use by the first terminal device 10.

A second terminal device 20 in accordance with a second aspect of the present invention is configured to be a second terminal device 20 which is capable of carrying out communication with a first terminal device 10 capable of carrying out communication via a first communication network and is also capable of carrying out communication via a second communication network, the second terminal device 20 including: a second control section 21; and a second storage section 24, the second control section 21 being configured to: carry out communication via the second communication network by use of user information, obtained from the first terminal device 10, about a user of the first terminal device 10; and delete data related to the user from the second storage section 24 at completion of the communication carried out by use of the user information.

According to the above configuration, it is possible to prevent leakage of personal information included in data related to a user, which is left in the second storage section 24 after completion of use of the second terminal device 20. Further, this configuration can be used to delete data such as paid contents that a user has purchased from the second storage section 24, so that any unauthorized user cannot access the contents.

A first terminal device 10 in accordance with a third aspect of the present invention is a first terminal device 10 which is capable of carrying out communication with a second terminal device 20 capable of carrying out communication via a second communication network and is also capable of carrying out communication via a first communication network, the first terminal device 10 including a first control section 11, the first control section 11 being configured to: transmit user information about a user of the first terminal device 10 to the second terminal device 20 and cause the second terminal device 20 to carry out communication via the second communication network by use of the user information and also limit at least partially a communication function performed via the first communication network; and cancel the limitation at completion of the communication carried out via the second communication network.

According to the above configuration, in a case where communication carried out by the first terminal device 10 via the first communication network is at least partially limited during use of the second terminal device 20, the limitation on the communication carried out via the first communication network is cancelled at completion of use of the second terminal device 20.

A communication system 100 in accordance with a fourth aspect of the present invention is a communication system 100 including: a first terminal device 10 capable of carrying out communication via a first communication network; and a second terminal device 20 capable of carrying out communication via a second communication network, the second terminal device 20 including a second control section 21, the second control section 21 being configured to: communicate with a predetermined server (cloud server 60) via the second communication network by use of user information, obtained from the first terminal device 10, about a user of the first terminal device 10; and save, on the predetermined server (cloud server 60), data that is generated through the communication carried out by use of the user information at completion of that communication. According to the above configuration, the same effects as those of the first aspect can be achieved.

A communication system 100 in accordance with a fifth aspect of the present invention is a communication system 100 including: a first terminal device 10 capable of carrying out communication via a first communication network; and a second terminal device 20 capable of carrying out communication via a second communication network, the second terminal device 20 including: a second control section 21; and a second storage section 24, the second control section 21 being configured to: carry out communication via the second communication network by use of user information, obtained from the first terminal device 10, about a user of the first terminal device 10; and delete data related to the user from the second storage section 24 at completion of the communication carried out by use of the user information. According to the above configuration, the same effects as those of the second aspect can be achieved.

A communication system 100 in accordance with a sixth aspect of the present invention is a communication system 100 including: a first terminal device 10 capable of carrying out communication via a first communication network; and a second terminal device 20 capable of carrying out communication via a second communication network, the first terminal device 10 including a first control section 11, the first control section 11 being configured to: transmit user information about a user of the first terminal device 10 to the second terminal device 20 and cause the second terminal device 20 to carry out communication via the second communication network by use of the user information and also limit at least partially a communication function performed via the first communication network; and cancel the limitation at completion of the communication carried out via the second communication network. According to the above configuration, the same effects as those of the third aspect can be achieved.

At least one of the first terminal device 10 and the second terminal device 20 in accordance with the aspects of the present invention may be realized by a computer. In such a case, the scope of the present invention encompasses: a control program for a terminal device, which causes a computer to operate as each section (software element) of at least one of the first terminal device 10 and the second terminal device 20 so that at least one of the first terminal device 10 and the second terminal device 20 can be realized by the computer; and a computer-readable storage medium which stores the control program.

The present invention is not limited to the above embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

10 First terminal device
11 First control section
20 Second terminal device
21 Second control section
24 Second storage section
60 Cloud server (predetermined server)
100 Communication system

The invention claimed is:

1. A first terminal device which is capable of carrying out communication with a second terminal device capable of carrying out communication via a second communication network and is also capable of carrying out communication via a first communication network, the first terminal device comprising:

a first control section, the first control section being configured to:

transmit user information about a user of the first terminal device to the second terminal device and cause the second terminal device to carry out communication via the second communication network by use of the user information and also limit at least partially a communication function performed via the first communication network; and cancel the limitation at completion of the communication carried out via the second communication network.

2. A communication system comprising:

a first terminal device capable of carrying out communication via a first communication network; and a second terminal device capable of carrying out communication via a second communication network, the first terminal device including a first control section, the first control section being configured to:

transmit user information about a user of the first terminal device to the second terminal device and cause the second terminal device to carry out communication via the second communication network by use of the user information and also limit at least partially a communication function performed via the first communication network; and cancel the limitation at completion of the communication carried out via the second communication network.

\* \* \* \* \*